May 8, 1923.
H. J. HAON
1,454,439
MEASURING AND FEEDING DEVICE
Filed July 17, 1919
4 Sheets-Sheet 3
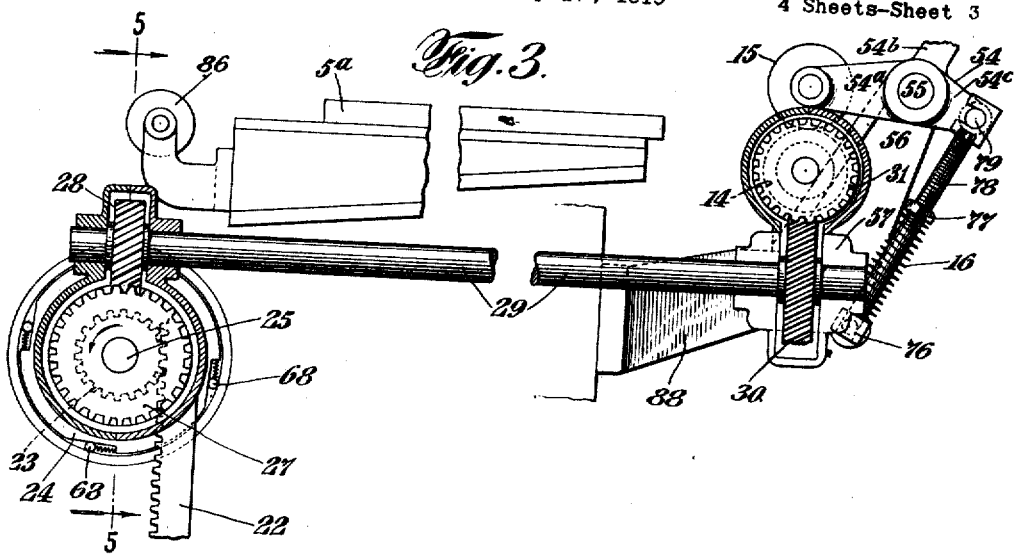
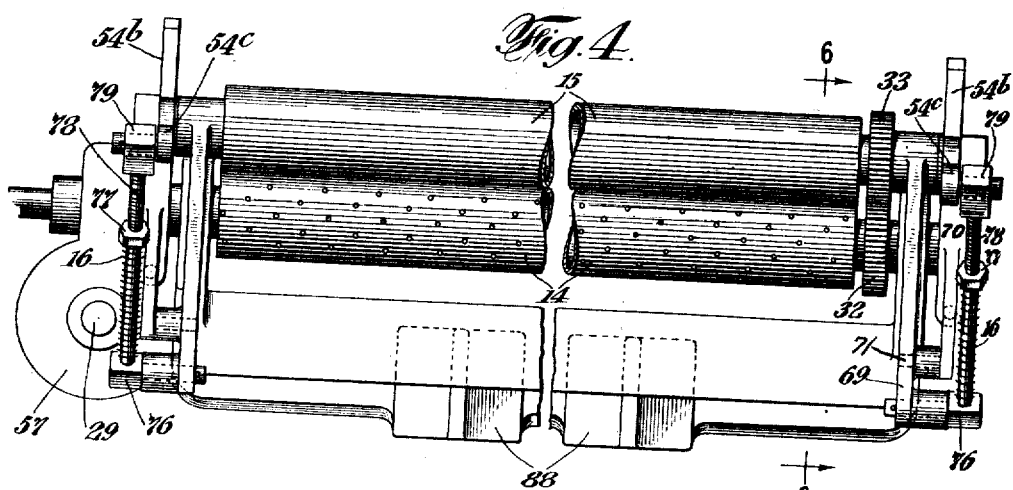
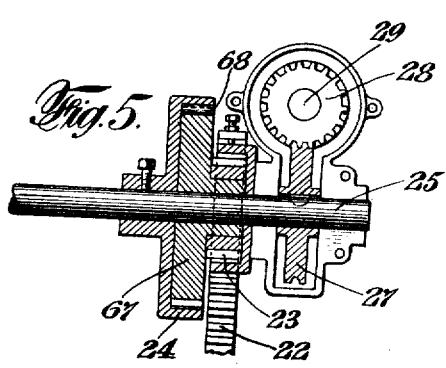
Inventor
H. J. Haon,
By
Attorney
F. R. Squair.

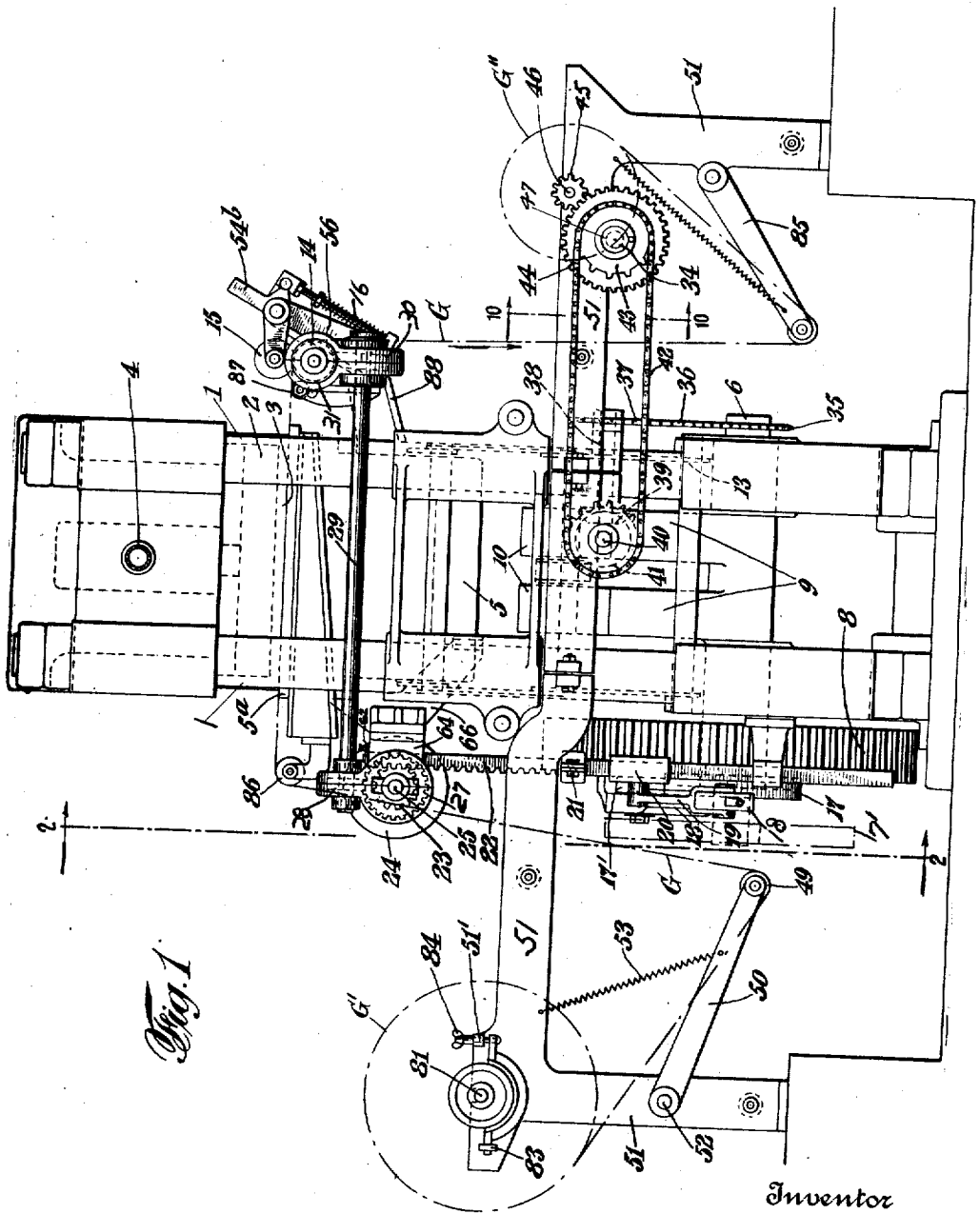

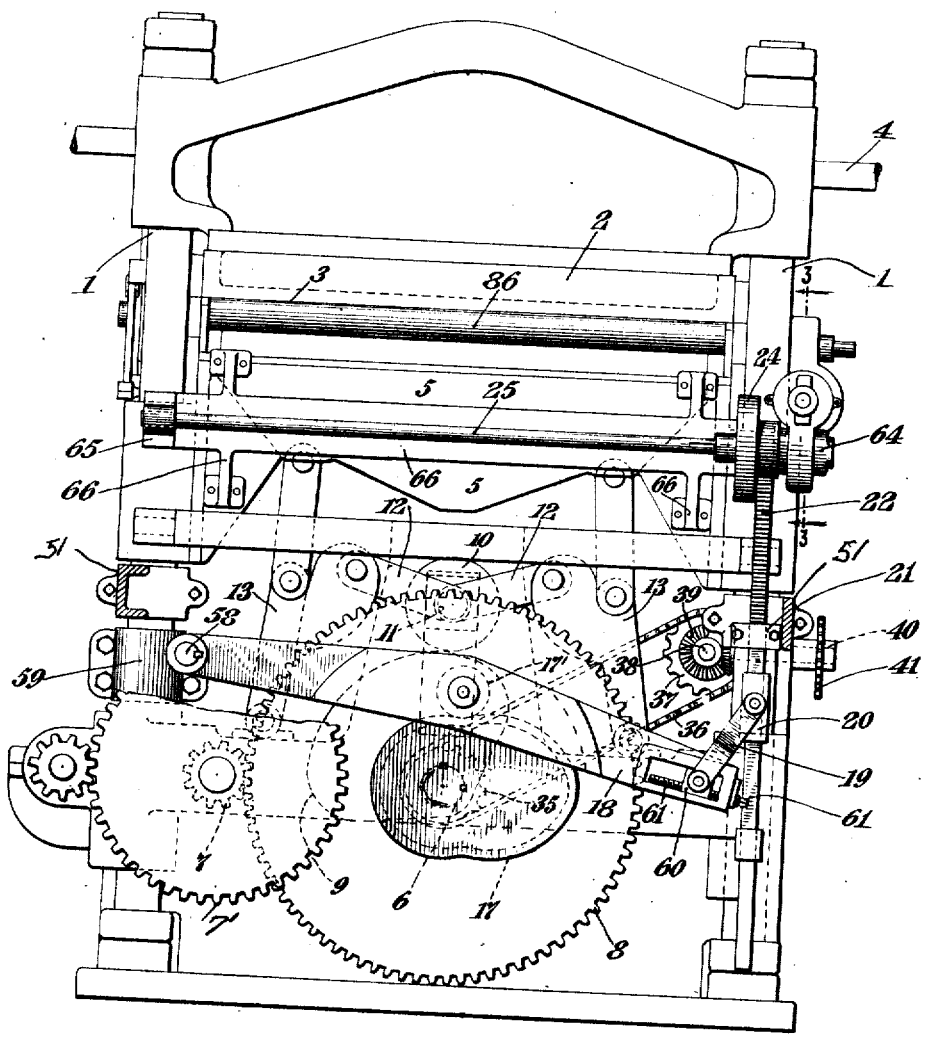

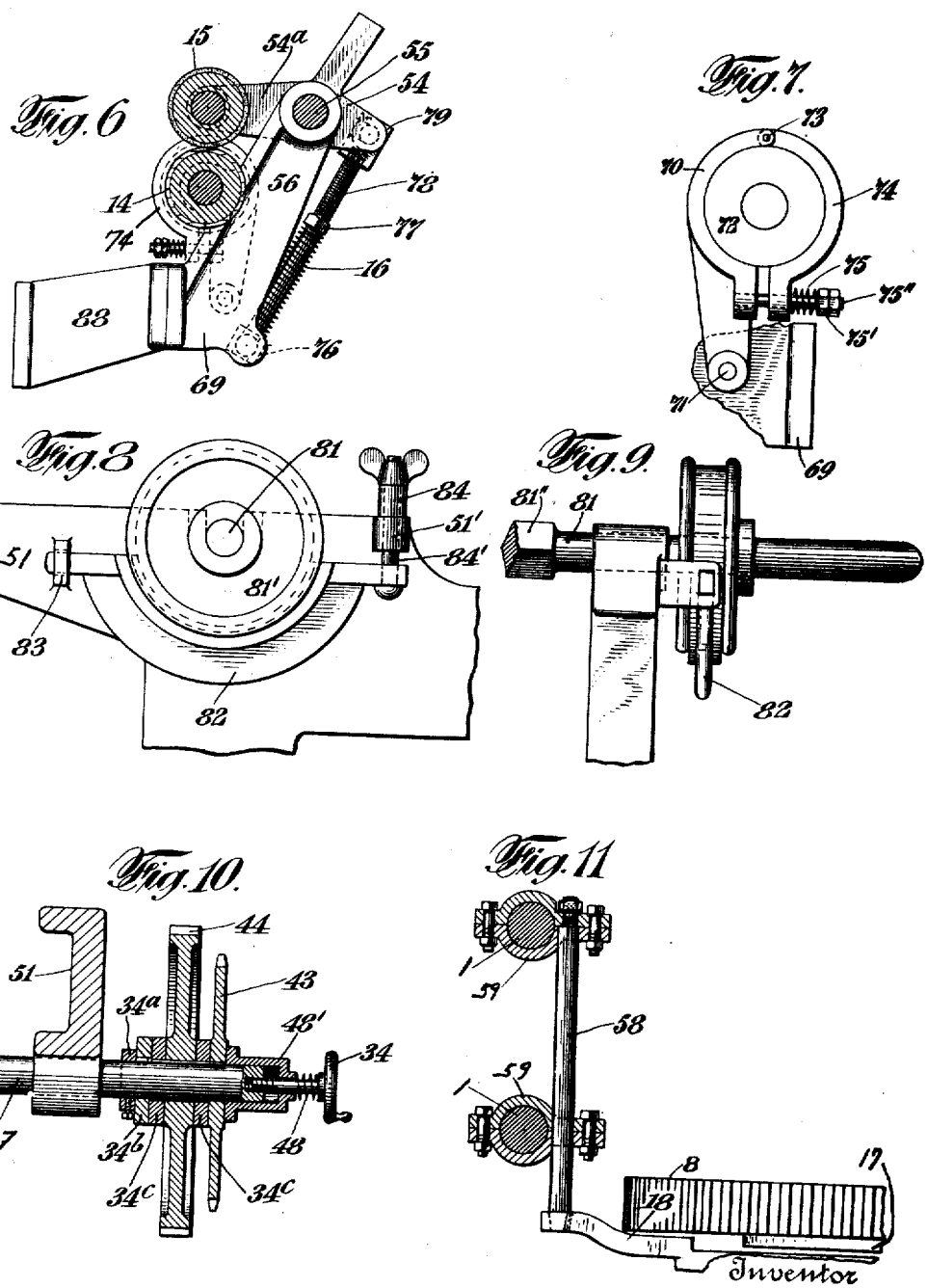

Patented May 8, 1923.

1,454,439

UNITED STATES PATENT OFFICE.

HARRY J. HAON, OF NEWBURGH, NEW YORK, ASSIGNOR TO E. I. DU PONT DE NEMOURS & COMPANY, OF WILMINGTON, DELAWARE, A CORPORATION OF DELAWARE.

MEASURING AND FEEDING DEVICE.

Application filed July 17, 1919. Serial No. 311,663.

*To all whom it may concern:*

Be it known that I, HARRY J. HAON, a citizen of the United States, and a resident of Newburgh, in the county of Orange and State of New York, have invented a certain new and useful Measuring and Feeding Device, of which the following is a specification.

This invention relates to devices for the measuring and feeding of determined lengths of goods such as leather, fabric, and leather substitute, and, more particularly, to a measuring and feeding device for embossing presses.

In the embossing of leather substitutes, and other goods of indefinite length which are passed step-by-step across the die of an embossing press, it is highly desirable that each embossed section register, at its margins running crosswise of the goods, with the margins of the sections next it. Otherwise, the embossed goods will objectionally show a series of cross bands at the meeting of the sections. The present invention provides an embossing press by which goods of an indefinite length are embossed section by section with substantially perfect matching, or registration of the margins of the successive impressions, and with which the embossing from end to end of a piece of indefinite length can be carried on automatically, accurately, and rapidly.

One object of the invention is to provide a machine, as an embossing press, having means for accurately feeding the goods acted on through the machine.

Another object is to provide a press for embossing goods of indefinite lengths, section by section, automatically and continuously.

Another object is to provide mechanisms for use with machines, as embossing presses, whereby such machines will automatically, continuously, and accurately act upon goods of indefinite lengths.

Another object is to provide a mechanism of the character indicated having goods-grasping means which grasp the goods on the body thereof between the margins, and preferably, at all parts from margin to margin.

To these ends, and also to improve generally upon devices and machines of the character indicated, the invention consists in the following matters hereinafter described and claimed.

Without restricting the invention thereto it is described by reference to the embodiment thereof illustrated in the accompanying drawings, and in these drawings:—

Figure 1 is a side elevation of a machine embodying the invention, a driving gear being shown merely by dot and dash lines;—

Figure 2 is an end view substantially at the line 2—2 of Fig. 1 looking in the direction of the arrows;

Figure 3 is a detailed fragmental side view of a portion of the feeding mechanism;

Figure 4 is a face view of the feeding rollers and certain related parts;

Figure 5 is a sectional detail substantially on line 5—5 of Figure 3;

Figure 6 is a side view of the feed roller bracket and pressure spring, mating those shown in Fig. 3;

Figure 7 is a side view of the feed roller brake;

Figure 8 is a side view of the brake for the roll of unembossed goods at the back of the machine;

Figure 9 is an edge view of the structure shown in Fig. 8;

Figure 10 is a detail of the friction drive for the winding roll;

Figure 11 is a detail of the mounting of the actuating lever, also showing fragments of the main gear and the feed cam;

Figure 12 is a detail of the upper end of the rack and related parts.

The illustrated embossing press proper (Figures 1 and 2) is of standard type, but for a better understanding of the present invention, this press is briefly described. It comprises four uprights 1 carrying a steam plate 2 at their upper ends. On this plate is carried the die 3, suitably heated by steam introduced through the pipe 4. The rising bed assembly, designated generally as 5, and providing the counter die 5ª, exemplifying a pressing element, reciprocates vertically on the uprights 1, to press sections of the goods G to be embossed against the die 3. The rising bed assembly is actuated from a main shaft 6 running longitudinally of the machine and receiving its motion from a pinion 7, driven by suitable gearing 7', and driving the gear 8 fast on the shaft. The shaft carries a series of cams, as 9, alike in action and arranged one behind the other. The cams actuate rollers, as 10, on a vertically reciprocatable shaft 11 that is connected by the links, as 12, 12, to the members of a toggle 13. The toggle is connected to the assembly 5. Thus, when the shaft 6 is rotated the counter die 5ᵃ is reciprocated. The goods travel through the press from the roll G' to the roll G''.

In carrying out the present invention:— A pair of rollers 14 and 15, (Figures 1 and 2), exemplifying a means for handling the goods, are mounted with the rising bed assembly, as by brackets 88, to reciprocate therewith, and are in position to grasp the goods between them. The upper roller 15 is forced toward the lower by springs 16, 16. The rollers are driven at the same surface speed in a direction to feed the goods (in this case pull the goods) through the press from back to front. And they grasp the goods all the way across the web. They are intermittently driven from a cam 17 on the main shaft 6, by way of a cam roller 17' on a lever or actuator 18, link 19, sliding striking block 20, struck block 21 fixed on a rack 22, loose gear 23, ratchet clutch 24, shaft 25, spiral gears 27 and 28, shaft 29, spiral gears 30 and 31 and (between the rollers) gears 32 and 33 (Fig. 4). Thus, there is provided a feeding means for the goods, the shaft 6 being a common operating means for the feeding means and the rising bed assembly. The cams 9 and 17 are so related, the parts so adjusted, and the gearing and the diameters of the rollers 14 and 15 so related, that, when the rising bed assembly is not in goods-pressing position, as shown, each time the counter die 5ᵃ is fully down and stationary, the rollers 14 and 15 are turned to feed through the press a section of goods equal to the front to back width of the effective surface of the die. Thus the mechanism provides for continuous embossing, section by section, of a web of goods of indefinite length.

In order that the goods issuing from the rollers 14 and 15 may be wound up as discharged, the roll G'' is driven from the main shaft 6, through a power transmitter or friction clutch 34. The friction of this clutch is so adjusted with respect to the pressure of the springs 16 that the roll G'' will not be turned to pull the goods between the closed rollers 14 and 15, but will wind up such goods as the rollers 14 and 15 deliver.

In the present instance (Figures 1, 2, and 10) this drive is by way of a sprocket 35 on the shaft 6, chain 36, sprocket 37, jackshaft 38 carried by the frame 51, bevel gears 39, shaft 40, sprocket 41, chain 42, sprocket 43, clutch 34 and gear 44. The latter drives the gear 45 fast on the shaft 46 that carries the goods G''. The sprocket 43 is slidably keyed to a rotatable shaft 47 while the gear 44 is loose on the shaft. By turning the screw 34 the friction between the sprocket 43 and the gear 44 can be adjusted, this being done by varying of the pressure of the expanding spring 48 against the sliding sleeve 48', and so against the sprocket 43. As shown, the clutch is backed up by a fixed collar 34ᵃ and has a keyed disc 34ᵇ and loose discs of leather 34ᶜ, 34ᶜ.

It is desirable that the pressure between the rollers 14 and 15 be kept relatively low, to obviate any possible damage to the embossed surface of the goods. So, it is desirable that, more particularly at the starting of the feed, the rollers do not have the duty of bringing the roll G' up to a surface speed equal to the desired linear speed of the goods during feeding. To this end, a compensator device, or slack provider, is provided (Figure 1). This comprises a bar or roller 49 extending across the web and carried at each end by a swinging arm, as 50, pivoted to the frame 51 at 52; each arm has a spring as 53 connecting it with the frame. The springs largely support the device when it is in its lowered position. But as the device rises the springs support it less and less and are insufficient to hold it up. In its lowered position the device provides sufficient slack to make substantially one step's length of goods. During the feeding the goods are taken from the slack so that the rollers do not have the duty of bringing the roll G' up to a surface speed equal to the feed speed. The device, 49 and 50, rises as the slack is taken up and later, the springs become less effective and, the travel of the web ceasing, falls to provide more slack. Of course, the parts are so related that the device will not cause slipping of the goods between the spring pressed rollers. Also, it will be understood, that, if desired, the compensator can be omitted, the pressure of the springs being increased sufficiently to provide for the rollers bringing the surface speed of the roll G' up to the feeding speed.

As here illustrated, the springs 16 and the rollers 14 and 15 are related as follows (Figures 1, 3, and 4):—The upper roller 15 is carried at each end by one arm 54ᵃ of a three-armed lever, as 54, pivoted at 55 to an extension 56 of the casting, as 57 (or 69) carried with the rising bed assembly. The arm 54ᶜ of this lever is forced upward by the expanding spring 16. The spring at its lower end abuts a block 76 pivoted to the casting, and at the upper end abuts a nut 77 adjustable on a rod 78. The rod is slidable through the block 76 and is attached to the arm 54ᶜ by the hook-block-and-pin 79; thus, the roller 15 is forced toward the roller 14 by a pressure which is adjustable by the nut 77. The arm 54ᵇ serves as a handle to lift the roller 15, as when introducing goods.

Briefly, to review the operation:—With the rising bed assembly down, the rack rises to turn the rollers and feed through a section of the goods, this section being taken from the slack goods provided by the compensator. The feed beginning, the friction drive of the storage roll becomes effective and winds up the goods as they discharge from the feed rollers. Substantially coincident with the ending of the feed, due to the rack reaching the end of its stroke, and, released by the ratchet clutch, starting to fall back, the rising bed assembly arises and embossing occurs. About at this time the compensator starts to fall and, so, unwinds another section of goods from the supply roll. Next, the rising bed assembly descends. Then, the feeding cam prepares to raise the rack, and so on. Thus, the device operates continuously and rapidly and practically without attention until the entire piece of goods has been embossed section by section, the sections registering practically exactly, end to end.

As to the details:—

Various adjustments of the rotation of the rollers 14 and 15 are provided:—The position of the fulcrum shaft 58 to which the lever 18 is fixed may be vertically adjusted (Fig. 11) by adjustment of the split collar 59 (duplicated at the front and back of the machine) which furnishes a bearing for the shaft 58 and may be tightened in various positions on the post 1. The lever 18 is boxed (Fig. 1) to receive a sliding block 60, to which the link 19 is pivoted. The block is longitudinally adjustable in the boxing by the screw 61 which is fixed against longitudinal movement in the box, but is rotatable therein and is screwed through the block 60. The struck block 21, which is struck by the block 20 to which the link 19 is pivoted is split and can be tightened in different vertical positions on the rack bar 22. The upper end of the rack bar 22 carries (Fig. 12) a cross-piece 62 which is provided with adjustable abutment screws 63, 63, which strike the housing casting 64 when the rack descends. By the adjustment of the screws the fall of the rack, and hence, the distance upward that the block 20 must move before striking the block 21, can be adjusted.

As shown (Figures 1, 2, 5, and 6), the loose gear 23, which receives its motion from the rack 22, is rotatable upon the shaft 25, extending across the machine and rotatable in the castings 64 and 65 carried with the rising bed assembly by the bracket 66. This gear is fast to the ratchet disc 67 rotatable on the shaft 25. The drum 24 of the ratchet clutch is fast on the shaft 25. The roller-receiving sockets 68 of the clutch are so faced that, upon the rising of the rack, the shaft 25 will be rotated to turn the rollers 14 and 15 to feed the goods, while the rack can descend without actuating the shaft 25. The casting 64 provides the housing for the gears 27 and 28 and the bearing for the shaft 29. The castings 57 and 69 provide bearings for the roller 14, the casting 57 also providing a housing for the gears 30 and 31, and a bearing for the shaft 29. Both castings are carried with the rising bed assembly by the bracket 88.

As shown, (Figs. 6 and 7), the roller 14 is provided with a friction brake. In this way any chance of the roller 14 over-running an exact step, due, say, to taking up of back lash, is obviated. A shoe piece 70 is attached to the casting 69 at 71 and extends part way around the drum 72 fixed on the shaft of the roller. To this shoe is hinged at 73, the other shoe piece 74 of the brake. At its other end this latter piece is adjustably forced toward the drum 72 by a spring 75 expanding between the end of the shoe and a nut 75' on a shank 75'' fixed in the shoe 70 against longitudinal movement toward the shoe 74 and passing loosely through the shoe 74.

The shaft 81 upon which the unembossed goods are carried may have an adjustable friction brake whereby to regulate the unwinding effect that the compensator may have. Here (Figs. 8 and 9) a shoe piece 82 is pivoted at 83 to the frame 51 and wipes upon a drum 81' on the shaft. The pressure is adjusted by the thumb-nut 84, screwed on the shank 84' fixed in the shoe 82 against upward longitudinal movement relative thereto and passing loosely through the abutment 51' on the frame and against which the nut abuts.

Various materials may be used for surfacing the rollers 14 and 15. In cases where only the top side of the goods is to be embossed it has been found satisfactory to surface the upper roller with felt and the lower one with picked-up metal—"nutmeg-grater".

If desired, a structure 85, similar to the compensator, may be used at the front of the machine to insure the carrying away of the goods from the rollers 14 and 15 should the roll G'' fail to pick up immediately.

Desirably, the shaft 81 (Fig. 9) and the shaft 46, or take up member, which carry the goods, are squared between their bearings, as at 81'', to be slipped through correspondingly squared apertures on the drums on which the goods are wound. And the bearings, provided at each end of the frame, are open at their tops to permit the lifting out of the shafts and the slipping on of the drums.

It will be understood that the pressing element 5 may or may not include an embossing die. In the present instance, layers of cardboard supporting layers of felt, to form the counter die 5ª, are provided.

Desirably, (Fig. 1), rollers 86 and 87 are carried by the rising bed assembly to support the goods, these rollers and the roller 14 being so placed that the goods lie in contact with the counter die.

Although the invention has been described with more particular relation to a press having a vertically reciprocating pressing element it will be understood that many features thereof are applicable to presses of other types.

The driving gear 7', gear 8, cam 17, roller 17' and lever 18 may, of course, be arranged with respect to each other in any suitable way. As here shown (Figures 1, 2, and 11) the gear 7' lies outside of the lever, while the gear 8, cam 17 and roller 17' lie behind the lever, the lever being curved outward longitudinally to clear the gear 8 and the cam 17, and carrying the roller 17' on the rear face. The cam 17 and the sprocket 35 are keyed to the shaft, as indicated in Fig. 2, while the various castings, brackets, etc., supporting the feeding rollers, etc., are detachably connected with the machine, whereby the feeding mechanism as a whole may be conveniently attached to existing machines.

The invention having thus been described, what is claimed is:—

1. In a web-feeding mechanism, for combination with a machine designed for acting on a web of goods and of the character indicated, such machine including a constantly driven element, means for acting on the web, and means for intermittently moving the same for acting on the web; in combination, a rotatable means for handling the web and mounted at one side of the machine, a rotatable shaft mounted upon, and extending along, the machine from side to side, gearing connecting said rotatable means and shaft and mounted at said one side, gearing connected with said shaft for rotating the same, and means for intermittently operating said second-named gearing in timed relation to said means for acting on the web and including a device connected with said constantly driven element; said last named means, said second-named gearing and said device being for mounting at the other side of the machine from said rotatable means and spaced therefrom by said rotatable shaft.

2. In a web-feeding mechanism, for combination with a machine designed for acting on a web of goods and of the character indicated, such machine including a driving-shaft; in combination, driven means for handling the web and mounted at one side of the machine, a rack, a ratchet clutch associated with said rack to be driven thereby, driven means connected with said driving shaft, connecting means for operatively connecting said driven means and said rack for at intervals moving the rack to operatively actuate said clutch, said rack, clutch, driven means and connecting means being associated and mounted at the other side of the machine from said web-handling means, and driven connecting means mounted upon, and extending along, said machine between said ratchet clutch at the one side and said web-handling means at the other side of the machine.

3. In a web supplying and feeding assembly, for combination with a machine of the character indicated and for operating upon a web of material, in combination, means for intermittently feeding the web to the machine, means for carrying the web to be fed, and adapted for such location with respect to said machine and feeding means as to permit a sag in the web therebetween, a weight resting on the web at the point of sag, and carried with it during the feed, and means for supporting the weight and of increasing supporting ability as the weight is lowered, whereby the supporting means is of increased supporting ability when the web is sagged and decreases in supporting ability as, during the feed and the lag of said web-carrying means, the sag is taken up and the weight rises, said carrying means being movable under the pull of said weight.

4. In a web supplying and feeding assembly, for combination with a machine designed for acting on a web of goods and of the character indicated and including co-acting elements operatively related for acting on such web: in combination, means for feeding the web step-by-step to said elements and including web-handling means, means for carrying the web to be fed and adapted for location in such position that the web rises in its travel to the handling means, and movable to discharge the web, and means to remove the goods from said carrying means; such removing means comprising a weight resting on the web and carried with it during the feed, and means for supporting said weight and of increasing supporting ability as the weight is lowered, whereby the supporting means is of increased supporting ability when the web and weight are in lower position and decreases in supporting ability as the web and weight rise during the feed, said carrying means being movable under the pull of said weight.

5. In a web supplying and feeding assembly, for combination with a machine designed for acting on a web of goods and of the character indicated and including co-acting elements operatively related for acting on such web: in combination, means for feeding the web step-by-step to said elements and including web-handling means, means for carrying the web to be fed and adapted for location in such position that the web rises in its travel to the handling means, and movable to discharge the web, and means to remove the goods from said carrying means; such removing means comprising a weight resting on the web and carried with it during the feed, and means for supporting said weight and comprising a spring from which said weight is suspended, said carrying means being movable under the pull of said weight.

6. In a web-feeding and web-storing assembly, for combination with a machine designed for acting on a web of goods and of the character indicated and including means for acting on the web: the combination with means for feeding the web to said acting means and including a grasping and handling device for the web and means for actuating the device, of means for storing the goods and including a driven take-up member, driving means for the same, and a power-transmitter operatively connecting said driving means and said member, said power transmitter having provisions for insuring that it will not pass power sufficient to enable the take-up member to pull the web from the grasp of the grasping device, 7. In a web-feeding and web-storing assembly, for combination with a machine designed for acting on a web of goods and of the character indicated and including means for acting on the web: the combination with means for feeding the web to said acting means and including a grasping and handling device for the web and means for actuating the device, of means for storing the goods and including a driven taken-up member, driving means for the same, and a power-transmitter operatively connecting said driving means and said member, said power transmitter including provisions for the transmission of power and mechanical provisions for adjusting and determining the power-transmitting ability of said first-named provisions to insure that said transmitter will not pass power sufficient to enable the take-up member to pull the web from the grasp of the grasping device.

8. In a feeding mechanism, for combination with a machine designed for acting on a web of material and of the character indicated, in combination, means for handling the web and means for driving the handling means, the latter including an actuating lever, a rack bar, a struck block fixed on the bar, a striker block slidable on the bar, a link connecting said lever and said striker block, means operatively connecting the rack bar and the handling means, and means for actuating said lever.

9. In a feeding mechanism, for combination with a machine designed for acting on a web of material and of the character indicated, in combination, means for handling the web and means for driving the handling means, the latter including an actuating lever, a rack bar, a struck block fixed on the bar, a striker block slidable on the bar, a link connecting said lever and said striker block, means operatively connecting the rack bar and the handling means, means for adjusting the stroke of said rack bar, and means for actuating said lever.

10. In an embossing press, in combination, a die element and a pressing element, one movable to and from the other and with respect to the hereafter-named driving element, means for imparting the to-and-fro movement to said movable element, a driven web-handling device for shifting the web with respect to said die and pressing elements and mounted upon said movable element to move to and fro therewith, a driving element, and driving connections between said driving element and said web-handling device, said connections including provisions providing for the movement of said web-handling device to and from the driving element as such device partakes of the to-and-fro movement of the movable element.

11. In an embossing press, in combination, a die element and a pressing element, one reciprocatable to and from the other and with respect to the hereafter-named driving element, the two co-acting for embossing a web of goods section by section, means for reciprocating said one element and including a driving element and connections whereby said driving element reciprocates the said one element at determined intervals, a driven web-handling device carried with the said one element in its reciprocations, grasping the web and arranged to feed the web between said co-acting elements when driven, and means for driving the handling device, said driving means including lost-motion provisions permitting the reciprocations of said device to and from the driving element as the device is carried by the said one element in its reciprocations, and also including provisions whereby said device is intermittently driven in timed relation to the reciprocations of the said one element.

12. In an embossing press, in combination, a die element and a pressing element, one reciprocatable to and from the other, and with respect to the hereafter named driving element, the two coacting for embossing a web of goods section by section, means for reciprocating the said one element and including a driving element and connections whereby said driving element reciprocates the said one element at determined intervals, a pair of web handling rollers carried with the said one element in its reciprocations, receiving the web, and arranged to feed the web between said coacting elements when rotated, means for rotating said rollers and operatively connecting said driving element and said rollers, said rotating means including lost motion provisions permitting the reciprocation of said rollers to and from the driving element as they are carried by the said one element in its reciprocations, and also including provisions whereby said rollers are intermittently rotated in timed relation to the reciprocations of the said one element.

13. In a web-feeding mechanism for combination with an embossing press, said press including a reciprocating element for acting on the web, a main drive shaft, and an operative connection between said shaft and said element providing for the reciprocation of said element by said shaft; in combination, a web-feeding means, such means including a driven device for handling the web and a step-by-step drive therefor; said drive including gearing for driving the said handling device, a rack, a ratchet clutch between said rack and gearing, means for actuating said rack-device and including a cam follower, and a cam mounted upon said main shaft and cooperating with said cam follower to actuate the same in timed relation to the reciprocations of said element.

14. In a web-feeding and web-storing mechanism for combination with an embossing press, said press including a reciprocating element for acting on the web, a main drive shaft, and an operative connection between said shaft and said element providing for the reciprocation of said element by said shaft; the combination with a web-feeding means, such means including a driven device for handling and grasping the web and a step-by-step drive therefor; said drive including gearing for driving the said handling device, a rack, a ratchet clutch between said rack and gearing, means for actuating said rack and including a cam follower, and a cam mounted upon said main shaft and cooperating with said cam-follower to actuate the same in timed relation to the reciprocations of said element; of a driven take-up member, and gearing for connecting said main shaft and said member, said gearing including a power transmitter having provisions for insuring that it will not pass power sufficient to enable the take-up member to pull the web from the grasp of the web-grasping device.

15. In a web-feeding and web-storing mechanism for combination with an embossing press, said press including a reciprocating element for acting on the web, a main drive shaft, and an operative connection between said shaft and said element providing for the reciprocation of said element by said shaft; the combination with a web-feeding means; such means including a pair of web grasping rollers and a step-by-step drive; said drive including gearing for driving said rollers, a rack, a ratchet clutch between said rack and gearing, means for actuating said rack and including a cam follower, and a cam mounted upon said main shaft and cooperating with said cam follower to actuate the same in timed relation to the reciprocation of said element; of a driven take-up member, and gearing connecting said main shaft and said member, said gearing including a power transmitter having provisions for insuring that it will not pass power sufficient to enable the take-up member to pull the web from the grasp of said rollers.

16. In a web-feeding mechanism for combination with an embossing press, said press including a reciprocating rising bed, a main driving shaft extending in a front-to-back direction relative to the rising bed, and an operative connection between said shaft and said bed providing for the reciprocation of said bed by said shaft; in combination, a driven device for handling the web and mounted at the front of said press, a cam mounted upon said main shaft at the back of the press and contoured to actuate its follower in timed relation to the reciprocations of said bed, a cam follower, and operative connections between said follower and said web-handling device.

17. In a web-feeding mechanism for combination with an embossing press, said press including a reciprocating rising bed, a main driving shaft extending in a front-to-back direction relative to the rising bed, and an operative connection between said shaft and said bed providing for the reciprocation of said bed by said shaft; in combination, a driven device for handling the web and mounted at the front of said press, a cam mounted upon said main shaft at the back of the press and contoured to actuate its follower in timed relation to the reciprocations of said bed, a cam follower, and operative connections between said follower and said web-handling device, such operative connections including a step-by-step mechanism co-operative with said cam follower, and a driving connection between said mechanism and said web-handling device.

18. In a web-feeding mechanism for combination with an embossing press, said press including a reciprocating rising bed, a main driving shaft extending in a front-to-back direction relative to the rising bed, and an operative connection between said shaft and said bed providing for the reciprocation of said bed by said shaft; in combination, a driven device for handling the web and mounted at the front of said press, a cam mounted upon said main shaft at the back of the press and contoured to actuate its follower in timed relation to the reciprocation of said bed, a cam follower, and operative connections between said follower and said web-handling device, such operative connections including a step-by-step mechanism co-operative with said cam-follower and mounted at the back of the press and a driving connection between said mechanism and said web-handling device.

19. In a web-feeding mechanism for combination with an embossing press, said press including a reciprocating rising bed, a main driving shaft extending in a front-to-back direction relative to the rising bed, and an operative connection between said shaft and said bed providing for the reciprocation of said bed by said shaft; in combination, a driven device for handling the web and mounted at the front of said press, a cam mounted upon said main shaft at the back of the press and contoured to actuate its follower in timed relation to the reciprocation of said bed, a cam follower, and operative connections between said follower and said web-handling device, such operative connections including a step-by-step mechanism cooperative with said cam follower, a shaft mounted on said bed, and means for connecting said shaft to said step-by-step mechanism and to said web-handling device.

20. In a web-feeding mechanism for combination with an embossing press, said press including a reciprocating rising bed, a main driving shaft extending in a front-to-back direction relative to the rising bed, and an operative connection between said shaft and said bed providing for the reciprocation of said bed by said shaft; in combination, a driven device for handling the web and mounted at the front of said press, a cam mounted upon said main shaft at the back of the press and contoured to actuate its follower in timed relation to the reciprocation of said bed, a cam follower, and operative connections between said follower and said web-handling device, such operative connections including a step-by-step mechanism cooperative with said cam follower and mounted at the back of the press, a shaft mounted on said bed to extend in a back-to-front direction therealong, and means for connecting said shaft to step-by-step mechanism and to said web-handling device.

21. In a web-feeding mechanism for combination with an embossing press, said press including a reciprocating rising bed, a main driving shaft extending in a front-to-back direction relative to the rising bed, and an operative connection between said shaft and said bed providing for the reciprocation of said bed by said shaft; in combination, a pair of web-handling rollers mounted at the front of said press, a cam mounted upon said main shaft at the back of the press and contoured to actuate its follower in timed relation to the reciprocations of said bed, a cam follower, and operative connections between said follower and said rollers, such operative connections including a step-by-step mechanism cooperative with said cam follower and mounted at the back of the press, a shaft mounted on said bed to extend from back to front thereof, and gearing for connecting said shaft to said step-by-step mechanism and to one of said rollers.

22. In a web-feeding mechanism for combination with a machine for acting on a web of goods and of the character indicated, in combination, a web-handling device mounted in proximity to one side of the machine, a variable motion imparter for mounting in proximity the other side of the machine thereby to be spaced from and removed from proximity to said web-handling device, and operative connections extending between said variable motion imparter and said web-handling device.

23. In a web-feeding mechanism for combination with a machine for acting on a web of goods and of the character indicated, in combination, a web-handling device mounted in proximity to one side of the machine, and means for driving said device; such means including step-by-step mechanism mounted in proximity to the other side of the machine thereby to be spaced from and removed from proximity to said web-handling device, and operative connections extending between said mechanism and said web-handling device.

24. In a web-feeding mechanism for combination with a machine for acting on a web of goods and of the character indicated, in combination, a web-feeding device mounted in proximity to one side of the machine, a variable-motion-imparting structure and a step-by-step mechanism structure operatively connected therewith and mounted in proximity to the other side of the machine thereby to be spaced from and removed from proximity to said web-handling means, and operative connections extending between one of said structures and said web-handling device.

In testimony that I claim the foregoing, I have hereunto set my hand this 14th day of July, 1919.

HARRY J. HAON.